3,415,697
METHOD AND COMPOSITION FOR EXOTHERMIC FLUXLESS BRAZING OF ALUMINUM AND ALUMINUM BASE ALLOYS
Nikolajs Bredzs and William Rostoker, Chicago, Ill., assignors, by mesne assignments, to Reynolds Metals Company, Richmond, Va., a corporation of Delaware
No Drawing. Filed Jan. 8, 1965, Ser. No. 424,202
21 Claims. (Cl. 149—109)

ABSTRACT OF THE DISCLOSURE

Fluxless brazing of aluminum and aluminum alloys employing an unreacted mixture of a particulate aluminum alloy (Al-X), such as an aluminum-magnesium alloy, and a particulate component (Al-Y) or Y', wherein X and Y or X and Y' are elements capable of reacting exothermically to form a high-melting intermetallic compound $X_nY_m$ or $X_nY'_m$, where $n$ and $m$ are whole numbers, when the mixture is heated to the molten state. The mixture is heated in contact with the aluminum surfaces to be joined by brazing to melt the mixture and produce an exothermic reaction, permitting the filler metal thus formed to solidify to form a brazed joint. The component (Al-Y) may be an alloy of aluminum with silicon, zinc, or germanium, and component Y' may be a low-melting metal such as bismuth, tin, lead or antimony.

---

This invention relates to the fluxless brazing of aluminum and aluminum base alloys. More particularly, the invention concerns novel aluminum alloy filler metal compositions and the methd of brazing therewith.

In the conventional brazing of aluminum, the natural oxide coating of the metal makes it necessary to use a flux which will melt below the brazing temperature and prepare the surfaces so the filler metal can flow into the joint. The brazing fluxes are usually alkali metal halides and have the disadvantage that they and their residues are hygroscopic and corrosive to the brazed joints. Hence efforts have been made previous to the present invention to avoid the necessity of using fluxes by providing filler alloys which would be self-fluxing. One such type of brazing alloy is disclosed in U.S. Patent 3,081,534, and is an alloy of aluminum, silicon, and lithium, with optional addition of copper.

The conventional brazing temperatures for aluminum and its alloys are in the neighborhood of 1100° F., or about 100° F. below the melting temperature of the material being brazed. The usual brazing alloys are alloys of aluminum and silicon, containing from about 7.5% to 12.5% silicon, and melting between about 1060° F. and 1180° F. This temperature range is considerably above annealing temperatures, which vary from about 650° F. to 800° F. for aluminum alloys, thus resulting in the brazed assembly being normally in the annealed condition. Hence conventional flux-brazing may make it necessary to employ rapid local heating to confine the annealing to only a small area where it will have the least deleterious effect.

In accordance with the present invention there are provided novel brazing filler alloy compositions which are capable of generating exothermic heat, thereby permitting brazing at considerably lower temperatures than heretofore employed. The novel filler metal compositions produce, moreover, a surface melting of the base metal at the base metal-filler metal interface on both sides of the joint which disintegrates or ruptures the aluminum oxide film on the bese metal, thus permitting brazing of aluminum and its alloys without fluxes and also eliminating the need for protective atmosphere.

The fluxless brazing compositions and methods of the invention are based upon the discovery that one or more alloys of aluminum with alloying elements which act as melting temperature depressants for aluminum, and which alloying elements are capable of combining in an exothermic reaction to form a high melting intermetallic compound, may be admixed in finely divided form to provide a heterogeneous filler metal. The brazing or joining method of the invention employs the heat of the exothermic reaction taking place between the two or more melting point depressant elements which react to form a high-melting intermetallic compound in the resulting heterogeneous filler metal. The high-melting intermetallic compound in turn imparts to the filler metal a marked increase in remelt temperature. The product of the exothermic bonding reaction is essentially a cermet-type joint structure with a very fine dispersion of the intermetallic compound scattered in a matrix of aluminum or aluminum alloy.

The exothermic reaction bonding or brazing compositions and methods of the invention involve the schematic reaction sequence:

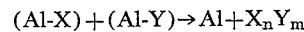

or

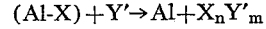

wherein X and Y or X and Y' are elements which react exothermically to form a high-melting intermetallic compound $X_nY_m$, or $X_nY'_m$ where $n$ and $m$ are whole numbers.

The aluminum alloys Al-X and Al-F are advantageously alloys which have a melting temperature considerably lower than that of pure aluminum, and are preferably eutectic alloys.

In accordance with the invention, the admixture of the two alloys or the alloy (Al-X) and the element Y', both in finely divided or particulate form, is applied to the joint to be bonded, and heat is applied, utilizing conventional brazing techniques. As soon as the two low melting alloys Al-X and Al-Y begin to melt, the formation of the intermetallic compound $X_nY_m$, accompanied by a considerable generation of heat in the joint area, begins immediately. This generation of heat, in turn, results in an instantaneous increase of the temperature of the molten filler metal. Depending upon the amount of heat generated, a certain amount of the solid base metal facing the molten filler metal film will be melted and dissolved in the molten filler metal. This occurs, however, without any appreciable increase in the temperature of the main body of the base metal.

Thus there are formed air-brazed joints of good shear strength with virtual elimination of corrosion problems attributable to the use of fluxes. The selection of the most effective exothermic brazing mixtures thus becomes a matter of achieving maximum heat of the exothermic reaction together with increase of remelt temperature of the filler metal, while at the same time assuring that the solidified filler metal in the joint will possess adequate corrosion resistance and mechanical properties.

In order to achieve the maximum heat effect of the exothermic reaction, the amounts of melting temperature depressant elements in the low melting aluminum alloys must be as large as possible, while at the same time, the amounts of these elements must be in substantially stoichiometric proportions, since the product of the exothermic reaction should contain only pure aluminum and intermetallic compound without any substantial excess of temperature depressant elements.

Temperature depressant elements which may be employed to form low melting aluminum alloys to be used in the brazing compositions of the invention include, for example, magnesium, germanium, zinc, copper, and silicon. These are alloyed with the aluminum in suitable proportions to provide low melting, and preferably eutectic, alloys. Thus, in the alloy (Al-X), X may be magnesium, zinc, or may also designate combinations of magnesium and copper, magnesium and zinc, or of magnesium with both zinc and copper, depending upon the melting characteristics desired. The second alloy (Al-Y) may be a low melting alloy in which Y is an element capable of reacting with the element X of the first alloy to form an intermetallic compound, such as, for example, silicon, germanium, or zinc.

In accordance with another aspect of the invention, however, the second component of the brazing composition need not be an aluminum alloy of the reacting element Y, but may be the reacting element itself, designated Y', particularly where the element Y' is substantially insoluble in molten aluminum. Examples of low melting metals Y' which may be employed for intermetallic compound formation include bismuth, tin, lead, and antimony. It will be understood that the invention is not limited to the combination of two alloy components, but that three or more may be employed provided that the criteria previously set forth are met.

The novel compositions and methods of the invention will be illustrated by four typical exothermic systems, but the invention is not to be considered as limited thereto:

(1) (Al-Mg)+(Al-Si) system.
(2) (Al-Mg)—(Al-Ge) system.
(3) (Al-Mg)+(Al-Zn) system.
(4) (Al-Mg)+Bi system.

Within each of these systems, the objective is to achieve the most effective mixtures for attaining the maximum heat of the exothermic reaction, together with the greatest increase of the remelt temperature. With this objective in mind, the foregoing alloy systems will be discussed individually.

(1) (Al-Mg)+(Al-Si) system.—Owing to the high affinity of Mg for Si, the following reaction takes place as soon as the two components of the exothermic mixture are in the molten state:

$$2Mg+Si \rightarrow Mg_2Si, \text{ M.P. } 1102° \text{ C.}$$

To achieve the maximum heat effect of the exothermic reaction, the amounts of the elements Mg and Si in the low-melting components of the exothermic mixture must be as large as possible and they must be in substantially stoichiometric proportion, since the product of the exothermic reaction should contain only pure Al and $Mg_2Si$ intermetallic compound with no substantial excess of Mg or Si. Preferably these requirements are achieved in a mixture of the two lowest melting binary eutectic alloys Al-Mg and Al-Si. An examination of the available binary phase diagrams reveals that the lowest melting eutectics, the amounts being percent by weight, are:

32Al-68Mg, M.P. 437° C. and

88Al-12Si, M.P. 577° C.

Hence, where these eutectics are utilized, the scheme for the exothermic reaction becomes:

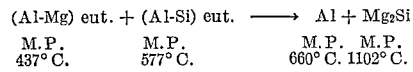

According to the available thermochemical data, the heat of formation of the compound $Mg_2Si$ is 19.0 Kcal./mole in the solid state at room temperature (298° K.). This amount of heat is capable of melting at 660° C. almost 7.5 gram-atoms (about 200 g.) of pure aluminum. However, in the filler metal mixtures of the invention, just before the exothermic reaction begins, the elements Mg and Si are dissolved in molten aluminum, and since each element has a small individual heat of solution in molten aluminum, these heats of solution must be subtracted from the heat of formation of the $Mg_2Si$ compound. Moreover, the compound $Mg_2Si$ can be dissolved in considerable amounts in molten as well as in solid aluminum. Hence, after the exothermic reaction has taken place and the filler metal has solidified, the crystals of $Mg_2Si$ may not be scattered in a matrix of pure aluminum, but instead may be scattered in a matrix of solidified Al-$Mg_2Si$ binary eutectic, which according to the known phase diagram, melts at 595° C. Hence the remelt temperature of the solidified filler metal in the joint will be about 595° C. instead of 660° C., the melting point of pure Al.

Although thermochemical evaluation indicates that the maximum heat effect and increase in remelt temperature of the filler alloy is attained by utilizing the two lowest melting eutectic alloys as components in an exothermic mixture blended in exactly stoichiometric proportions, experience has shown that in practice the product of the exothermic reaction, i.e. the solidified filler metal in the joint, is likely to be proportionately too high in $Mg_2Si$ (25% by weight) and too low in aluminum (75% by weight) to have satisfactory corrosion resistance and mechanical properties. Accordingly it is necessary to vary the relative proportions of the (Al-Mg) alloy and the (Al-Si) alloy within a fairly wide range, in order to obtain an optimum content of $Mg_2Si$ compound in the filler metal, while at the same time preserving essentially the stoichiometric proportions of Mg and Si themselves.

In accordance with the invention, the proportion of (Al-Mg) alloy to (Al-Si) alloy may range from about 10:1 to about 10:30, depending upon the respective alloy compositions.

Further, in accordance with the invention, the ratio of Al to Mg in the (Al-Mg) alloy may vary from about 10 to 90 parts by weight of aluminum to from 90 to 10 parts by weight of magnesium. When the (Al-Mg) alloy contains less than about 10% Mg, its melting temperature rises and the loss of Mg must be made up by the inclusion of one or more temperature depressant elements, such as copper or zinc or both.

The (Al-Mg) alloys possess self-fluxing properties, but the (Al-Si) alloys do not. However, it was found, surprisingly and unexpectedly, that the (Al-Si) alloys tend to improve the self-fluxing properties of the (Al-Mg) alloys, even though they do not possess this property themselves.

The composition of the (Al-Si) alloys is maintained within a fairly narrow range, in which the proportion of Al to Si may vary from about 89:11 to about 87:13, the preferred ratio being 88:12, the parts being by weight. This is the eutectic alloy, as mentioned previously.

In the practice of the invention, it is preferred to maintain the proportion of (Al-Mg) alloy to that of (Al-Si) alloy so that there is present a slight excess of Mg over that required stoichiometrically for the formation of $Mg_2Si$.

In the preparation of the exothermic mixtures of the invention, the general procedure is to produce the desired (Al-Mg), (Al-Si), (Al-Ge), (Al-Zn) and like alloys, by melting the pure metals in selected proportions in a suitable furnace, such as in induction furnace, under a dry inert atmosphere, such as, for example, helium. Such alloys ordinarily are brittle enough to be capable of crushing into a fine powder, but atomizing of the molten alloy may be employed for that purpose. The exothermic alloy mixtures are then precompacted under a pressure of about 70,000 p.s.i. to discs having a thickness of about 1/16 inch to 1/32 inch, and a diameter of about 0.75 inch, and the discs are then suitable for brazing aluminum. Alternatively, the powder may be formed into cold-rolled shims.

The average particle size of the crushed alloys is of importance, for if they are too coarse, the intermetallic compound resulting from the exothermic reaction forms only along the grain boundaries of the component alloys and prevents their proper mixing. If the particles are too fine grained, good distribution and exothermic reaction will result, but the mixtures are more difficult to prepare and to preserve because of their tendency to oxidize. For most of the alloys employed, a suitable range of particle sizes is from about 75 to about 210 microns (200 to 65 mesh). However, in the case of the (Al-Ge) alloys the particle size may suitably be somewhat larger, from about 210 to 840 microns.

The following examples serve to illustrate the preparation and properties of exothermic mixtures of (Al-Mg) +(Al-Si), but are not to be regarded as limiting:

EXAMPLE 1

In order to reduce the percentage of intermetallic compound $Mg_2Si$ in the exothermic reaction product, a 50Al-50Mg alloy, in percent by weight, was prepared, using the procedure previously described. This alloy had a slightly higher melting temperature (460° C.) than the eutectic 32Al-68Mg alloy (437° C.). As the second component there was employed the eutectic (Al-Si) alloy which is 88Al-12Si.

According to stoichiometric calculations, the respective alloys were combined in the proportions of 8.311 g. and 20.00 g. in order to produce 21.755 g. of Al and 6.555 g. of $Mg_2Si$ in the filler metal in place. However, with a slight excess of the (Al-Si) component, the chemical reaction believed to take place when this mixture is employed for exothermic brazing, is:

Mixture (1)

7 g. (50 wt. percent Al-50 wt. percent Mg)

M.P. 460° C.

+20 g. (88 wt. percent Al-12 wt. percent Si) ⟶

M.P. 577° C.

27 g. (78.15 wt. percent Al-20.45 wt. percent $Mg_2Si$-1.4 wt. percent Si)

solidus temp. 580° C.

The respective alloys in the amounts indicated were crushed to a particle size of 200 microns and formed into thin wafers.

EXAMPLE 2

In order to prepare exothermic brazing mixtures yielding reduced amounts of the intermetallic compound $Mg_2Si$, which would also produce proportionally reduced amounts of exothermic heat, a mixture was prepared with an addition of an equal weight of pure aluminum powder to the (Al-Mg)+(Al-Si) mixture, while at the same time preserving approximately the same stoichiometric proportion of Mg and Si as in mixture (1) of Example 1. The procedure employed was that set forth in Example 1.

Mixture (2)

3.5 g. (50 wt. percent Al-50 wt. percent Mg)

M.P. 460° C.

+10.0 g. (88 wt. percent Al-12 wt. percent Si) + 13.5 g. Al ⟶

M.P. 577° C.        M.P. 660° C.

27 g. (89.1 wt. percent Al-10.20 wt. percent $Mg_2Si$-0.7 wt. percent Si)

solidus temp. 595° C.

EXAMPLE 3

In order to examine further mixtures yielding reduced amounts of $Mg_2Si$ and lower exothermic heat, the following mixtures were prepared having a decreasing Mg content of the (Al-Mg) component:

Mixture (3)

7 g. (75 wt. percent Al-25 wt. percent Mg.)

solidus temp. 450° C.

+10 g. (88 wt. percent Al-12 wt. percent Si) ⟶

M.P. 577° C.

17 g. (82.6 wt. percent Al-16.2 wt. percent $Mg_2Si$-1.2 wt. percent Si)

solidus temp. 585° C.

Mixture (4)

7 g. (87.5 wt. percent Al-12.5 wt. percent Mg)

solidus temp. 490° C.

+5 g. (88 wt. percent Al-12 wt. percent Si) ⟶

M.P. 577° C.

12 g. (87.7 wt. percent Al-11.5 wt. percent $Mg_2Si$-0.8 wt. percent Si)

solidus temp. 590° C.

Mixture (5)

3.4 g. (87.5 wt. percent Al-12.5 wt. percent Mg)

solidus temp. 490° C.

+2.0 g. (88 wt. percent Al-12 wt. percent Si) ⟶

M.P. 577° C.

5.4 g. (87.6 wt. percent Al-12.14 wt. percent $Mg_2Si$-0.17 wt. percent Mg)

solidus temp. 595° C.

Mixture (6)

10 g. (90 wt. percent Al-10 wt. percent Mg)

solidus temp. 515° C.

+5.8 g. (88.4 wt. percent Al-11.6 wt. percent Si) ⟶

M.P. 577° C.

15.8 g. (89.4 wt. percent Al-10.0 wt. percent $Mg_2Si$-0.6 wt. percent Si)

solidus temp. 595° C.

in the manner described in Example 1.

In accordance with another aspect of the invention, there are provided exothermic brazing mixtures yielding less than 10% by weight of the intermetallic compound $Mg_2Si$, which would also produce less than about 10% of the heat of formation of the pure $Mg_2Si$ compound, by reducing the Mg content of the (Al-Mg) component of the (Al-Mg)+(Al-Si) exothermic series to below 10% by weight. However, the solidus temperature of the (90Al-10Mg) alloy is above 500° C. and the liquidus temperature is above 600° C. Hence in reducing the Mg content substantially below 10% by weight, the ignition temperature of the exothermic reaction may tend to approach the melting temperature of pure aluminum (660° C.) so closely as to create operating difficulties.

Hence, in accordance with the invention, where the amount of Mg is less than about 10%, at least one additional melting temperature depressant element may be incorporated in the Al-Mg alloy. Such additional elements include, for example, copper, zinc, or both copper and zinc. The ternary and quaternary alloys can be prepared by adding small amounts of magnesium to low melting binary and ternary alloys of aluminum with copper and/or zinc.

The preparation of the foregoing exothermic mixtures is illustrated by the following non-limiting examples:

EXAMPLE 4

A ternary Al-Cu-Mg alloy was prepared by adding 7.6 wt. percent of Mg to the lowest melting eutectic in the binary Al-Cu system (67 wt. percent Al-33 wt. percent Cu). The resulting low-melting Al-Cu-Mg alloy was utilized in powdered form as the Mg-containing component, while powdered 88 wt. percent-12 wt. percent Si alloy was employed as the Si-containing component, to prepare an exothemic mixture. The resulting amounts of Mg and Si were in approximately stoichiometric proportions, with a slight excess of Si. The resulting mixture and the chemical reaction taking place in the molten filler metal mixture is as follows:

Mixture (7)

5.0 g. (64.3 wt. percent Al-28.6 wt. percent Cu-7.1 wt. percent Mg) +

2.0 g. (88 wt. percent Al-12 wt. percent Si)→

7.0 g. (71.1 wt. percent Al-20.4 wt. percent Cu-8.0 wt. percent $Mg_2Si$-0.5 wt. percent Si)

EXAMPLE 5

A ternary Al-Zn-Mg alloy was prepared by adding 12.0 wt. percent of Mg to the low-melting 70Al-30Zn alloy (solidus temperature 430° C.). The resulting low-melting Al-Zn-Mg alloy in powdered form was utilized as the Mg-containing component of an exothermic mixture in which the 88Al-12Si alloy served as the Si-containing component. The relative amounts of Mg, Si and Zn were selected in such proportion as to provide enough Mg to combine with all the Si present in the form of $Mg_2Si$ compound and with part of the Zn in the form of an $MgZn_2$ compound. Consequently, the components of the filler metal after completion of the exothermic reaction was Al-Zn-$Mg_2Si$-$MgZn_2$. The resulting mixture and the chemical reaction taking place in the molten mixture was as follows:

Mixture (8)

5.0 g. (63.0 wt. percent Al-26.5 wt. percent Zn-10.5 wt. percent Mg) +
2.0 g. (88 wt. percent Al-12 wt. percent Si) →
7.0 g. (70.1 wt. percent Al-10.5 wt. percent Zn-10.0 wt. percent $MgZn_2$-9.4 wt. percent $Mg_2Si$)

EXAMPLE 6

Proceeding as in Example 4, there was prepared a powdered Al-Cu-Zn-Mg alloy containing only 5% Mg, and a powdered 88Al-12Si alloy as the second component of an exothermic mixture. The amounts of Mg and Si were in almost stoichiometric proportion, with a slight excess of Si. After completion of the reaction, the components of the solidified filler metal were Al-Zn-Cu-$Mg_2Si$-Si. Since Mg has a much higher affinity for Si than has Zn, there is only one intermetallic compound present, namely $Mg_2Si$. The resulting mixture and the chemical reaction taking place when molten is as follows:

Mixture (9)

8.0 g. (78.5 wt. percent Al-11.5 wt. percent Zn-5.0 wt. percent Cu-5.0 wt. percent Mg) +
2.0 g. (88 wt. percent Al-12 wt. percent Si) →
10.0 g. (80.4 wt. percent Al-9.2 wt. percent Zn-6.31 wt. percent $Mg_2Si$-4.0 wt. percent Cu-0.09 wt. percent Si)

(2) (Al-Mg)+(Al-Ge) system.—Owing to the high affinity of Mg for Ge, the following reaction takes place as soon as the two components of the exothermic mixture are in the molten state:

$$2Mg + Ge \rightarrow Mg_2Ge, \text{ M.P. } 1115° \text{ C.}$$

A comparison of the binary phase diagrams Al-Mg and Al-Ge shows that the lowest melting eutectics in these two systems have practically identical melting temperatures:

32 wt. percent Al-68 wt. percent Mg, M.P. 437° C.
47 wt. percent Al-53 wt. percent Ge, M.P. 424° C.

The comparatively low melting temperatures of these two eutectics provides a correspondingly low ignition temperature for the exothermic reaction in which an (Al-Mg)+(Al-Ge) mixture is used. The maximum heat of reaction will result and the maximum increase in remelt temperature of the filler alloy will be obtained by blending these two eutectics in exactly stoichiometric proportion. However, in such case, the solidified filler metal in the joint will be extremely high in $Mg_2Ge$ content (58 wt. percent) and too low in aluminum (42 wt. percent) to have the necessary corrosion resistance and mechanical properties.

Hence in order to reduce the amount of intermetallic compound $Mg_2Ge$ formed, the Mg content of the (Al-Mg) compound was decreased in the same manner as was done with the (Al-Mg)+(Al-Si) system. The various mixtures were prepared employing the technique of Example 1. The mixtures were not stoichiometric with respect to Mg and Ge, but employed an excess of Ge.

In accordance with the invention, the proportion of (Al-Mg) alloy to (Al-Ge) alloy may range from about 10:1 to about 10:25, depending upon the respective alloy compositions. The ratio of Al to Mg in the (Al-Mg) alloy may vary from about 10 to 90 wt. percent of aluminum. The composition of the (Al-Ge) alloys is maintained with a narrow range, in which the proportion of Al to Ge may vary from about 40:60 to about 60:40, in parts by weight, the preferred ratio being the eutectic alloy 47Al:53Ge.

The following non-limiting examples, illustrate the preparation of this series in mixtures:

EXAMPLE 7

A 50Al-50Mg alloy was prepared as described in Example 1. As the second component there was employed the eutectic alloy 47 wt. percent Al-53 wt. percent Ge, M.P. 424° C. The chemical reaction taking place when these alloys are melted together is:

Mixture (10)

7 g. (50 wt. percent Al-50 wt. percent Mg)
M.P. 460° C.
+18 g. (47 wt. percent Al-53 wt. percent Ge) 
M.P. 424° C.
25 g. (48 wt. percent Al-35 wt. percent $Mg_2Ge$-17 wt. percent Ge)

EXAMPLE 8

In order to reduce the amount of intermetallic compound $Mg_2Ge$ formed, the Mg content of the (Al-Mg) component was decreased to 25% by weight. The chemical reaction taking place when the resulting mixture is melted is:

Mixture (11)

7 g. (75 wt. percent Al-25 wt. percent Mg)
M.P. 450° C.
+9 g. (47 wt. percent Al-53 wt. percent Ge) ——→
M.P. 424° C.
16 g. (59 wt. percent Al-27.5 wt. percent $Mg_2Ge$-13.5 wt. percent Ge)

EXAMPLE 9

Reducing the Mg content still further, a mixture was prepared which produces the following reaction upon melting:

Mixture (12)

7 g. (87.5 wt. percent Al-12.5 wt. percent Mg)
M.P. 490° C.
+4.5 g. (47 wt. percent Al-53 wt. percent Ge) ——→
M.P. 424° C.
11.5 g. (71.6 wt. percent Al-19 wt. percent $Mg_2Ge$-9.4 wt. percent Ge)

(3) (Al-Mg)+(Al-Zn) system.—Owing to the high affinity of Mg for Zn, the following reaction occurs as soon as these two components of the exothermic mixture are melted together:

$$Mg + 2Zn \rightarrow MgZn_2$$ 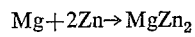

The heat of formation of this compound appears to be considerably lower than that of $Mg_2Si$.

A comparison of the binary phase diagrams involved in this system indicates that the Al-Zn system has a considerably lower melting point of the binary eutectic than has the Al-Mg system:

32 wt. percent Al-68 wt. percent Mg, M.P. 437° C.

5 wt. percent Al-95 wt. percent Zn, M.P. 275° C.

However, in order to maximize heat effect, while avoiding adverse corrosion and mechanical properties, an exothermic mixture of (50 wt. percent Al-50 wt. percent Mg)+(5 wt. percent Al-95 wt. percent Zn) was found advantageous.

In this system, however, the proportion of (Al-Mg) alloy to (Al-Zn) alloy may range from about 10:1 to about 10:30, depending upon the respective alloy compositions.

The following example illustrates the preparation of an exothermic mixture in this system, but is not to be regarded as limiting:

EXAMPLE 10

Proceeding as in Example 1, a mixture of powdered 50Al:50Mg and 5Al:95Zn was prepared. The chemical reaction taking place upon melting of this mixture is:

Mixture (13)

3.53 g. (50 wt. percent Al-50 wt. percent Mg)
M.P. 460° C.
+10.0 g. (5 wt. percent Al-95 wt. percent Zn) ⟶
M.P. 275° C.
13.53 g. (17 wt. percent Al-83 wt. percent $MgZn_2$)
solidus temp. 475° C.

(4) (Al-Mg)+Bi system.—Owing to the high affinity of Mg for Bi, the following reaction occurs as soon as these two components of the exothermic mixture are in the molten state:

$$3Mg + 2Bi \rightarrow Mg_3Bi_2$$

In this system, the proportions of (Al-Mg) alloy to Bi may range from about 10:1 to about 10:5.

The following non-limiting example illustrates the preparation of an exothermic mixture within this system:

EXAMPLE 11

A (Al-Mg) alloy containing 90% Al and 10% Mg was prepared as in Example 1, while pure bismuth powder was employed as the second component. The resulting exothermic mixture reacts according to the equation:

Mixture (14)

0.0 g. (90 wt. percent Al-10 wt. percent Mg) + 5.74 g. Bi ⟶
solidus temp. 515° C.  M.P. 271° C.
15.74 g. (57.2 wt. percent Al-42.7 wt. percent $Mg_3Bi_2$-0.1 wt. percent Bi)

The exothermic fluxless brazing compositions of the invention may be applied in connection with the conventional methods of brazing aluminum and aluminum alloys, including torch, furnace, induction, and resistance brazing methods. In order to illustrate the practice of the invention, methods of torch brazing will be described, but it is to be understood that the invention is not to be regarded as limited thereto.

The various powdered exothermic mixtures previously described were recompacted under a pressure of 70,000 p.s.i. to form discs or shims having a diameter of about 0.75 inch and having a thickness between 1/16 and 1/32 inch.

The aluminum alloy selected for brazing tests was No. 1100 alloy, in the form of strips having the dimensions 4 x 1 x 1/8 inches. The surfaces were prepared prior to brazing by hand scrubbing with a brass wire brush and degreasing in trichloroethylene vapor. The flat ends of the 1100 aluminum alloy strips were torch brazed in air without the use of fluxes or protective atmospheres, using an oxy-acetylene flame, and using the disc preplaced between the overlapping ends of a pair of strips, while C-clamps were used to press the faying surfaces together during brazing.

Joints brazed with the (50 wt. percent Al-50 wt. percent Mg)+(88 wt. percent Al-12 wt. percent Si) mixture yielded the highest shear strengths, namely 2780 p.s.i., 2720 p.s.i., average 2570 p.s.i. The addition of Cu or Zn to the low magnesium alloys appears to produce a strengthening effect on the filler metal.

The following table shows average and maximum shear strengths obtained in tests on 1100 aluminum alloy strips employing the 14 respective exothermic mixtures previously described in the examples:

TABLE I

| Mixture No. | Brazing composition, percent by weight | Shear strength, p.s.i. | |
|---|---|---|---|
| | | Average | Maximum |
| 1 | 7 g. (50 Al-50 Mg), 20 g. (88 Al-12 Si). | 2,570 | 2,780 |
| 2 | 3.5 g. (50 Al-50 Mg), 10 g. (88 Al-12 Si), 13.5 g. Al. | 1,637 | 1,969 |
| 3 | 7 g. (75 Al-25 Mg), 10 g. (88 Al-12 Si). | 2,098 | 2,240 |
| 4 | 7 g. (88.5 Al-12.5 Mg), 5 g. (88 Al-12 Si). | 2,180 | 2,490 |
| 5 | 5.4 g. (87.5 Al-12.5 Mg), 2.0 g. (88 Al-12 Si). | 1,713 | 1,856 |
| 6 | 10 g. (90 Al-10 Mg), 5.8 g. (88.4 Al-11.6 Si). | 1,313 | 1,788 |
| 7 | 5 g. (64.3 Al-28.6 Cu-7.1 Mg), 2 g. (88 Al-12 Si). | 2,075 | 2,626 |
| 8 | 5 g. (63 Al-26.5 Zn-10.5 Mg), 2 g. (88 Al-12 Si). | 2,246 | 2,331 |
| 9 | 1.6 g. (78.5 Al-11.5 Zn-5 Cu-5 Mg), 0.4 g. (88 Al-12 Si). | 2,271 | 2,535 |
| 10 | 7 g. (50 Al-50 Mg), 18 g. (47 Al-53 Ge). | 1,720 | 1,810 |
| 11 | 7 g. (75 Al-25 Mg), 9 g. (47 Al-53 Ge). | 1,850 | 2,260 |
| 12 | 7 g. (87.5 Al-12.5 Mg), 4.5 g. (47 Al-53 Ge). | 1,940 | 2,200 |
| 13 | 3.53 g. (50 Al-50 Mg), 10 g. (5 Al-95 Zn). | 890 | 1,358 |
| 14 | 10 g. (90 Al-10 Mg), 5.74 g. pure Bi. | 1,210 | 1,335 |

Metallographic investigation of the joints brazed with the exothermic mixtures of the invention showed that the heat of reaction produced melting of a comparatively thick layer of the 1100 aluminum alloy base metal at the base metal-filler metal interface on both sides of the joint. This surface melting by disrupting the aluminum oxide film facilitates brazing without fluxes or protective atmospheres.

What is claimed is:

1. A composition suitable for exothermic fluxless brazing of aluminum and aluminum base alloys comprising an unreacted mixture of a particulate aluminum alloy (Al-X) having a melting point or solidus temperature in the range from about 437° C. to about 515° C. and a particulate member selected from the group consisting of an aluminum alloy (Al-Y) and at least one low-melting metal Y', said alloy (Al-Y) having a melting point of solidus temperature in the range from about 275° C. to about 577° C. and said metal Y' being selected from the group consisting of bismuth, tin, lead and antimony, said alloy and member respectively providing elements X and Y, or X and Y', for exothermic reaction to form a high-melting intermetallic compound $X_nY_m$ or $X_nY'_m$, where $n$ and $m$ are whole numbers, when said mixture is heated to the molten state, each of said particulate alloy and member being of sufficiently low melting characteristic to render the mixture effective for brazing.

2. A composition suitable for fluxless brazing of aluminum and aluminum base alloys comprising an unreacted mixture of a particulate low-melting metal Y' selected from the group consisting of bismuth, tin, lead and antimony, and a particulate aluminum alloy (Al-X) having a melting point or solidus temperature in the range from about 437° C. to about 515° C. providing an element X for exothermic reaction with Y' to form a high-melting intermetallic compound $X_nY'_m$, where $n$ and $m$ are whole numbers, when said mixture is heated to the molten state, each of said particulate alloy and metal being of sufficiently low melting characteristic to render the mixture effective for brazing.

3. A composition suitable for fluxless brazing of aluminum and aluminum base alloys comprising an unreacted mixture of a particulate aluminum-magnesium alloy having a melting point or solidus temperature in the range from about 437° C. to about 515° C. and at least one particulate low-melting metal Y' selected from the group consisting of bismuth, tin, lead and antimony, effective for exothermic reaction with magnesium to form a high-melting intermetallic compound when said mixture is heated to the molten state.

4. The composition of claim 3 in which Y' is bismuth.

5. A composition suitable for fluxless brazing of aluminum and aluminum base alloys comprising an unreacted mixture of two particulate aluminum alloys (Al-X) and (Al-Y) respectively providing elements X and Y for exothermic reaction to form a high-melting intermetallic compound $X_nY_m$, where $n$ and $m$ are whole numbers, when said mixture is heated to the molten state, each of said particulate alloys being of sufficiently low melting characteristic to render the mixture effective for brazing, said alloy (Al-X) having a melting point or solidus temperature in the range from about 437° C. to about 515° C. and said alloy (Al-Y) having a melting point or solidus temperature in the range from about 275° C. to about 577° C.

6. The composition of claim 5 in which at least one of the particulate aluminum alloys has a substantially eutectic composition.

7. A composition suitable for exothermic fluxless brazing of aluminum and aluminum base alloys comprising an unreacted mixture of a particulate aluminum-magnesium alloy containing about 10% to about 90% magnesium, by weight, and a particulate alloy of aluminum and an element selected from the group consisting of silicon, germanium, and zinc.

8. A composition suitable for exothermic fluxless brazing of aluminum and aluminum base alloys and comprising an unreacted mixture of a particulate aluminum-magnesium alloy containing up to about 10% magnesium by weight and at least one addition temperature depressant element selected from the group consisting of copper and zinc, and a particulate alloy of aluminum and an element selected from the group consisting of silicon, germanium and zinc.

9. A composition suitable for exothermic fluxless brazing of aluminum and aluminum base alloys comprising an unreacted mixture of a particulate aluminum-magnesium alloy having a melting point or solidus temperature in the range from about 437° C. to about 515° C. and a particulate aluminum-silicon alloy of substantially eutectic silicon content.

10. The composition of claim 9 in which the proportion of aluminum-magnesium alloy to aluminum-silicon alloy ranges from about 10:1 to about 10:30 parts by weight.

11. The composition of claim 9 in which the average particle size range of the mixture is from about 75 to about 200 microns.

12. A composition suitable for exothermic fluxless brazing of aluminum and aluminum base alloys comprising an unreacted mixture of a particulate aluminum-magnesium alloy and a particulate aluminum-silicon alloy, wherein said aluminum-magnesium alloy contains about 10% to about 90% magnesium by weight.

13. A composition suitable for exothermic fluxless brazing of aluminum and aluminum base alloys comprising an unreacted mixture of about 7 parts by weight of a particulate substantially 50 wt. percent Al-50 wt. percent Mg alloy and about 20 parts by weight of a particulate substantially 88 wt. percent Al-12 wt. percent Si alloy.

14. A composition suitable for exothermic fluxless brazing of aluminum and aluminum base alloys comprising an unreacted mixture of a particulate aluminum-magnesium alloy having a melting point or solidus temperature in the range from about 437° C. to about 515° C. and a particulate aluminum-germanium alloy, said mixture providing magnesium and germanium for reaction to form an intermetallic compound when the mixture is heated to the molten state.

15. The composition of claim 14 in which the average particle size range of said aluminum-germanium alloy is from about 210 to about 840 microns.

16. The composition of claim 14 in which said aluminum-germanium alloy contains about 40% to about 60% germanium by weight.

17. A composition suitable for exothermic fluxless brazing of aluminum and aluminum base alloys comprising an unreacted mixture of a particulate aluminum-magnesium alloy having a melting point or solidus temperature in the range from about 437° C. to about 515° C. and a particulate low-melting essentially binary alloy of aluminum and zinc, said mixture providing magnesium and zinc for reaction to form an intermetallic compound when the mixture is heated to the molten state.

18. Method for the fluxless brazing of aluminum and aluminum alloys which comprises the steps of (a) forming an unreacted mixture of a particulate aluminum alloy (Al-X) and a particulate member selected from the group consisting of an aluminum alloy (Al-Y) and at least one low melting metal Y', wherein X and Y or X and Y' are present in amounts capable of reacting exothermically to form a high-melting intermetallic compound $X_nY_m$ or $X_nY'_m$ where $n$ and $m$ are whole numbers, when said mixture is heated to the molten state, (b) placing said mixture between two aluminum surfaces to be joined by brazing, (c) heating said mixture in contact with said aluminum surfaces to melt said mixture and produce said exothermic reaction, and (d) permitting the filler metal thus formed to solidify to form a brazed joint.

19. The method of claim 18 in which said exothermic brazing mixture is applied between the aluminum surfaces to be joined in the form of a precompacted disc.

20. The method of claim 18 in which said exothermic brazing mixture is applied between the aluminum surfaces to be joined in the form of a cold-rolled shim.

21. The method of claim 18 in which the brazing mixture is a mixture of an aluminum-magnesium alloy and an aluminum-silicon alloy, the magnesium and silicon being present in proportions to form said intermetallic compound upon heating.

References Cited

UNITED STATES PATENTS

| 1,997,166 | 4/1935 | Brown | 75—146 X |
| 2,075,090 | 3/1937 | Bonsack et al. | 75—146 |
| 2,106,827 | 2/1938 | Brown | 75—146 X |
| 2,602,413 | 7/1952 | Miller | 75—146 X |
| 2,821,495 | 1/1958 | Dulin | 75—148 X |
| 2,916,815 | 12/1959 | Donkervoort | 75—138 X |
| 3,081,534 | 3/1963 | Bredzs | 75—148 X |
| 3,157,735 | 11/1964 | Stroup et al. | 75—138 X |
| 3,235,959 | 2/1966 | Bartoszak | 75—208 X |
| 3,290,145 | 12/1966 | Daugherty | 75—208 X |

BENJAMIN R. PADGETT, *Primary Examiner.*

S. J. LECHERT, *Assistant Examiner.*

U.S. Cl. X.R.

29—498.5, 500; 148—27; 252—188.3; 219—85; 75—.5